Figure 1:
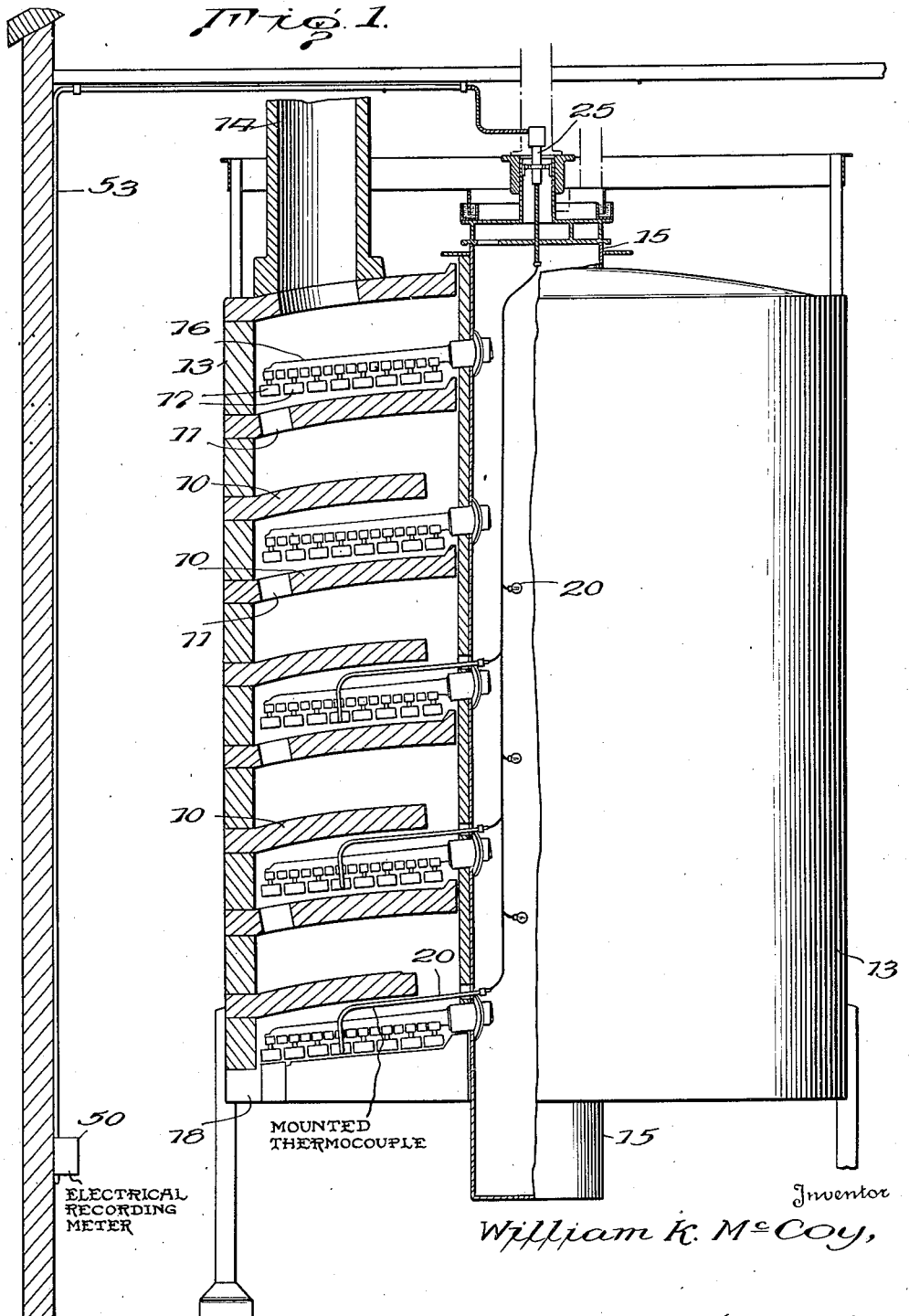

Feb. 22, 1938.  W. K. McCOY  2,109,396
THERMOCOUPLE SYSTEM
Filed June 3, 1937  2 Sheets-Sheet 1

Inventor
William K. McCoy,
By G. M. Houghton
his Attorney

Feb. 22, 1938.  W. K. McCOY  2,109,396
THERMOCOUPLE SYSTEM
Filed June 3, 1937  2 Sheets-Sheet 2
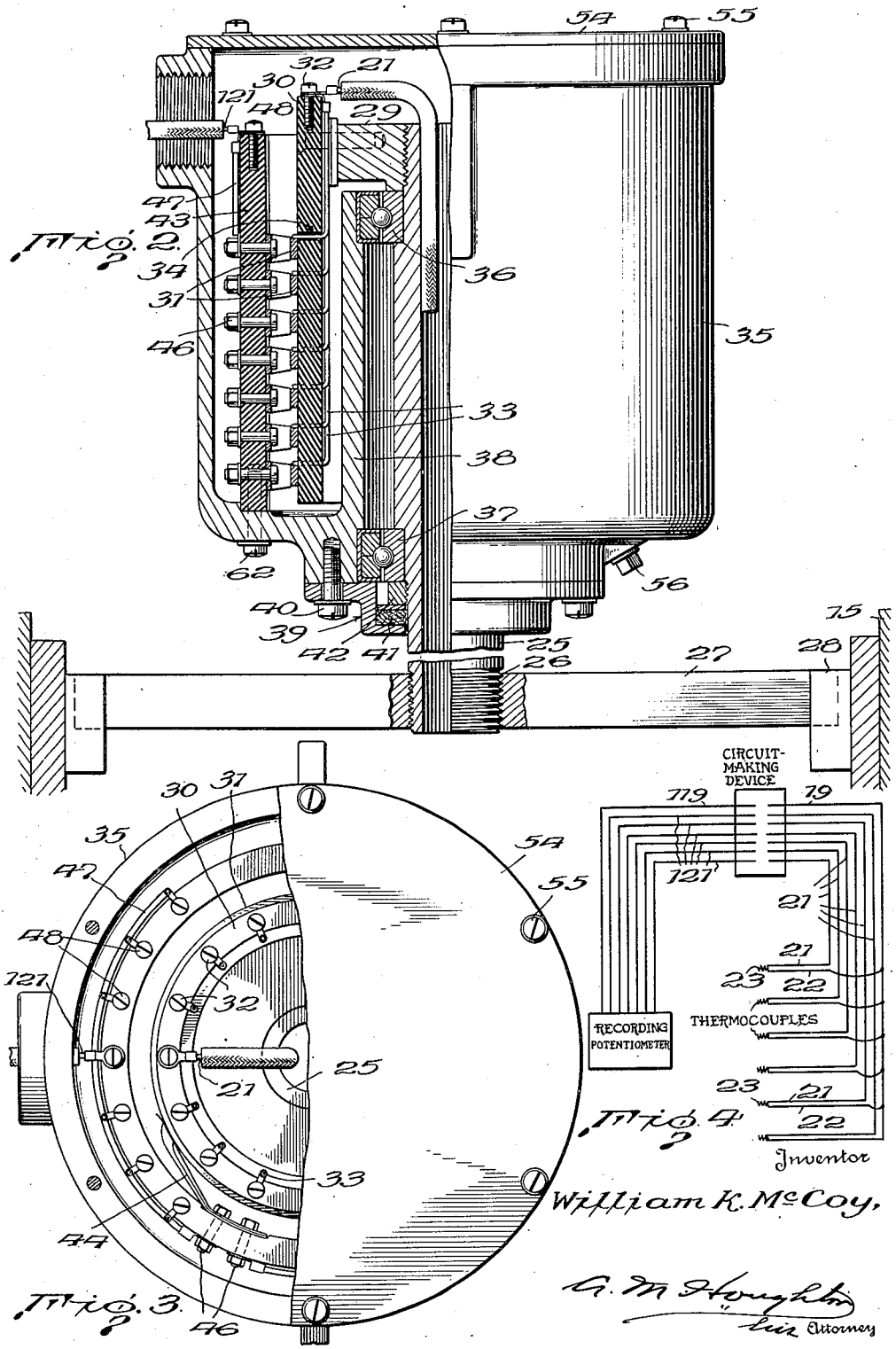

Patented Feb. 22, 1938

2,109,396

UNITED STATES PATENT OFFICE 2,109,396

THERMOCOUPLE SYSTEM

William K. McCoy, Pittsburgh, Pa., assignor to Gulf Oil Corporation, Pittsburgh, Pa., a corporation of Pennsylvania Application June 3, 1937, Serial No. 146,292

5 Claims. (Cl. 73—351)

This invention or discovery relates to thermocouple systems; and it comprises a thermocouple system for measuring temperatures at a plurality of points in a rotary apparatus, said system comprising a set of thermocouples mounted on the rotary apparatus, a stationary indicating or recording instrument, a plurality of conducting rings mounted in fixed relation to the rotary apparatus and electrically connected to the thermocouples, a plurality of stationary contact elements engaging the rings and in electrical connection with the indicating instrument, stationary means for mounting the contact elements and for insulating them from each other and an enclosing housing for said rings, contact elements and mounting and insulating means; all as more fully hereinafter set forth and as claimed.

In rotary furnaces of the wedge type for burning or heat-treating granular decolorizing clay, a plurality of discoid hearths are provided, one above the other, and a central axle is provided having rabble arms adapted to agitate the clay and move it from one hearth to another. The hearths have openings in their floors, and hot products of combustion from an oil flame pass through the openings and "burn" the clay. The clay is caused to eventually move from the top of the furnace to an outlet at the bottom.

Proper regulation of such a furnace requires an accurate knowledge of temperature of the clay particles on each of the several hearths. If the temperature is too high the clay is over-burnt, and if too low the clay is under-burnt; either condition being undesirable. The best system hitherto known for determining clay temperatures involves the use of a plurality of thermocouples mounted in the rabble arm blades so as to be in contact with the clay. There is the difficulty, however, that the thermocouples are all moving with the axle during operation. In a typical arrangement the indicating instrument (electrical indicator or recorder) is mounted on the rabble arm axle. With such an arrangement, the operator must walk around as the shaft revolves, to take a reading. There are the additional disadvantages that a meter mounted on the axle is subjected to furnace fumes and heat, and is subjected to excessive vibration. It has been possible only to employ comparatively rugged, but insensitive, meters of the millivoltmeter type, because of the severe mechanical jarring to which they are subjected.

According to the present invention I provide a thermocouple system for such installations, wherein a stationary meter, advantageously of the sensitive potentiometer type, is provided, in a place not exposed to excessive vibration, and electrical connections are brought from the thermocouples to the meter through rings arranged to rotate with the axle, and fixed brushes. Means for sealing and protecting the connection-making device are provided.

In the accompanying drawings there is shown, more or less diagrammatically, an example of apparatus within the purview of the present invention. In the drawings, Fig. 1 is a view, partly in elevation and partly in vertical section, of a wedge type clay burning furnace, with the system of the present invention installed therein, Fig. 2 is a view, partly in elevation and partly in vertical section of the circuit-connecting means by itself, Fig. 3 is a plan view corresponding to Fig. 3, and Fig. 4 is a diagram showing the electrical circuits.

In the drawings, Fig. 1 shows a wedge type furnace of known construction, comprising a plurality of hearths 10, shown as nine in number, and having peripheral openings 11. The hearths are mounted in a shell 13 having a stack 14. The hearths and shell are made of or lined with suitable heat resisting material. A central rotary axle 15 is provided in the form of a cylinder mounted in suitable bearings (not shown) and carrying a plurality of rabble arms 16 having blades 17. Two sets of arms are provided for each hearth, but only one set of arms shows in the figure. The arms for alternate hearths are mounted at right angles to each other on the cylinder. In operation, clay (not shown) is fed into the furnace at the uppermost hearth and the axle is rotated by suitable power means (not shown), at a rate of a few revolutions per minute. Hot gases from an oil burner (not shown) below the furnace rise through openings 11 and pass over the hearth and burn the clay thereon which is gradually urged by the rabble blades to lower hearths finally issuing at an opening 18. A plurality of thermocouples is provided. In the drawings there is shown one tube-mounted thermocouple 20 for each of six rabble arms in the six lower hearths; though a greater or less number can be used. These thermocouple mountings are known per se and need not be described. In operation, the thermocouples are drawn through the clay on the hearths as the arms revolve and respond to clay temperatures. Each thermocouple per se consists of an iron wire 21 and a constantan wire 22 joined at a junction 23 (Fig. 4). At the top of the axle is positioned a connection-making device, shown in detail in Fig. 2. The part of the device which moves with the axle includes a drive tube or spindle 25 threadedly attached at 26 to a drive arm 27 which is detachably retained in socket members 28 attached to the interior of the axle 15, as shown. At the upper end of the drive tube is a collar 29 supporting a tubular sleeve 30 concentric with the drive tube. Sleeve 30 is made of some insulating material such as micarta, which has good mechanical strength and is not prone to warping. On this sleeve are located seven rings 31 of polished copper or the like. The thermocouples are connected to these rings. Each constantan wire of each thermocouple (six in all), is connected to one of the rings, and a single common iron wire connection 19 for all the thermocouples is made to the remaining ring. In Figs. 2 and 3 only one of these wires is shown, for the sake of clarity of presentation. The connections will be clear from Fig. 4. As shown in Fig. 2, connections are made by providing screws 32 in the top of sleeve 30, to which the thermocouple wires are attached, and having copper wires 33 extending downward, passing through holes 34 in the sleeve and attached to the rings.

The stationary part of the connection-making device includes a cup-like housing or casing 35, advantageously of cast iron mounted for relative rotation with respect to the drive tube, with two ball bearings 36 and 37 retained in an inner upwardly extending sleeve 38. Sleeve 38 and the walls of the housing define a receptacle for oil, as described subsequently. The lower ball bearing is held in place by a collar 39 screwed to the container by screws 40 and having oil sealing means 41 around the drive tube. The lower ball bearing is also retained to the drive tube by a screw collar 42 and the upper ball bearing is retained to the drive tube by the collar 29. In the casing is mounted as by screws 62 a sleeve 43 of insulating material somewhat similar to sleeve 30 and surrounding sleeve 30. To this sleeve are attached a plurality of brushes 44 (shown as seven in number; one for each of the six constantan wire connections and one for the common iron wire connection). Each advantageously consists of a plurality of strips of springy metal as shown in Fig. 3, making contact with the rings. Each brush is attached to the sleeve by two bolts 46. Electrical connection for the brushes is made from bolts 46 by wires 47 to a set of screws 48 in the top of the sleeve.

Outside the furnace, at some location free from vibration and fumes, is positioned a suitable meter, advantageously a six-point recording potentiometer 50 of a type known per se. Electrical connections are made from screws 48 to the potentiometer by constantan wires 121 and an iron wire 119, as shown in Fig. 4. In Figs. 2 and 3, only one of these connections is shown, for the sake of clarity. Advantageously these wires are enclosed in suitable conduit means 53 (Fig. 1).

The stationary casing is covered with a plate 54 retained by screws 55. The container is adapted to retain a body of oil, and such is provided (not shown in the figure) for the purpose of lubricating the rotary mechanism and sealing the contact points from the air. It is found that using a high grade refined oil there is no tendency for gum to form and an excellent seal is made.

A drain plug 56 in the lower part of the casing allows the oil to be drained out if desired.

In operation, the rabble arms, axle and drive tube 25 all revolve and the rings rotate with respect to the brushes. Electrical connections are continuously made through the rings and brushes. In the example shown, the stationary part of the circuit-making device simply rests or floats on the rotary part and is retained against rotation by the conduit. This arrangement is convenient as it allows the whole device to shift up and down and sideways without strain when irregularities take place in the motion of the axle.

My system provides a way for using a highly sensitive indicating or recording meter in connection with the thermocouples mounted on a rotary part subject to heavy vibration. The connection-making device has proved to be eminently fool-proof and free from break-down and, which is quite important, it does not introduce a varying resistance in the thermocouple connections.

What I claim is:

1. A thermocouple system for measuring temperatures at a plurality of points in a rotary apparatus, comprising a set of thermocouples mounted on the rotary apparatus, a stationary registering instrument, a spindle, means for mounting the spindle on the rotary apparatus for rotation therewith, a plurality of circular conducting members mounted on the spindles so as to rotate with the rotary apparatus and electrically connected to the thermocouples, a plurality of stationary contact elements engaging the circular conducting members and in electrical connection with the indicating instrument, stationary means for mounting the contact elements, an enclosing housing for said conducting members, contact elements and mounting means, and bearing means for supporting the housing on the spindle.

2. A thermocouple system for measuring temperatures at a plurality of points in a rotary apparatus, said system comprising a set of thermocouples mounted on the rotary apparatus, a stationary registering instrument, a plurality of conducting rings mounted in a fixed relation to the rotary apparatus and electrically connected to the thermocouples, a plurality of stationary contact elements engaging the rings and in electrical connection with the registering instrument, stationary means for mounting the contact elements and an enclosing housing for said rings, contact elements and mounting means and a body of oil contained in the housing and surrounding the contact elements and rings.

3. A thermocouple system for measuring temperatures at a plurality of points in a rotary apparatus, said system comprising a set of thermocouples mounted on the rotary apparatus, a stationary registering instrument, a set of circular conducting members and a corresponding set of contact members slidably engaging said conducting members, one of said sets of members being arranged for rotation with the rotary apparatus and the other set being stationary, said conducting members and contact members being arranged for rotation with respect to each other while maintaining electrical contact, an enclosing housing for said conducting members and contact members, a body of oil in the casing immersing said conducting members and contact members, and electrical connections from the thermocouples to the rotary set of members and electrical connections from the stationary set of members to the registering instrument.

4. A thermocouple system for measuring temperatures at a plurality of points in a rotary apparatus, comprising a set of thermocouples mounted on the rotary apparatus, a stationary registering instrument, an insulative rotary supporting means arranged in operable relation to the rotary apparatus so as to be rotated thereby, an enclosing housing for the rotary supporting means, a set of circular conducting members and a like set of contact members, one set of members being insulatively mounted in the housing and the other set being mounted on said rotary supporting means, bearing means between the rotary supporting means and housing, and means for connecting the thermocouples to one set of members and for connecting the other set of members to the registering instrument.

5. A thermocouple system for measuring temperatures at a plurality of points in a rotary apparatus, comprising a set of thermocouples mounted on the rotary apparatus, a stationary electrical registering instrument, a spindle attached to the rotary apparatus for rotation therewith, an insulating sleeve attached to the spindle, a stationary housing surrounding said sleeve and spindle, a second insulating sleeve mounted in the housing concentric with the first sleeve, a set of annular conducting members mounted on one sleeve and a set of contact members mounted on the other sleeve and in sliding electrical contact with the annular members, and electrical connections from one set of members to the thermocouples and from the other set of members to the registering instrument.

WILLIAM K. McCOY.